(12) United States Patent
Briggs

(10) Patent No.: US 7,978,689 B1
(45) Date of Patent: Jul. 12, 2011

(54) APPARATUS, SYSTEM AND METHOD FOR TRANSMITTING VOICE AND DATA OVER ETHERNET

(75) Inventor: Christopher Briggs, Douglasville, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 3240 days.

(21) Appl. No.: 10/178,888

(22) Filed: Jun. 24, 2002

(51) Int. Cl.
*H04L 12/66* (2006.01)
(52) U.S. Cl. .......... 370/353; 370/352
(58) Field of Classification Search .......... 370/352, 370/353
See application file for complete search history.

(56) References Cited

U.S. PATENT DOCUMENTS

| | | | |
|---|---|---|---|
| 5,553,071 A * | 9/1996 | Aranguren et al. | 370/433 |
| 6,463,051 B1 * | 10/2002 | Ford | 370/352 |
| 6,587,454 B1 * | 7/2003 | Lamb | 370/352 |
| 6,747,995 B1 * | 6/2004 | Brown et al. | 370/493 |
| 6,760,326 B1 * | 7/2004 | Takeda et al. | 370/352 |
| 6,834,056 B2 * | 12/2004 | Hayes | 370/440 |
| 2002/0095498 A1 * | 7/2002 | Chanda et al. | 709/225 |

OTHER PUBLICATIONS

Implementing Media Gateway Control Protocols (A RADVision White Paper)—RADVisionLtd. Published on Apr. 1, 2002.*
VLAN Information—University of California (UCDAVIS) http://net21.ucdavis.edu/newvlan.htm. Published on Feb. 2, 1999.*
IEEE Std 802.1Q—1998 (First Page).*
NBX 100 Communications System Data Sheet—Mar. 2001.*
The 3Com NBX 100 Communications System: High-Performance Telephony for Small and Midsize Enterprises (White Paper)—Sep. 2000.*

* cited by examiner

*Primary Examiner* — Donald L Mills
(74) *Attorney, Agent, or Firm* — Myers Bigel Sibley & Sajovec

(57) ABSTRACT

An apparatus. The apparatus includes a network interface card in communication with a telephone, a functional circuit in communication with the network interface card, and an Ethernet port in communication with the functional circuit. The functional circuit is for constructing an Ethernet frame.

18 Claims, 8 Drawing Sheets

| PRE 52 | SFD 54 | DA 56 | SA 58 | L/T 60 | DATA 62 | FCS 64 |

| PRE 52 | SFD 54 | DA 56 | SA 58 | 1st 68 | 2nd 69 | L/T 60 | DATA 62 | FCS 64 | where 68 and 69 are bracketed as 66.

APPARATUS, SYSTEM AND METHOD FOR TRANSMITTING VOICE AND DATA OVER ETHERNET

BACKGROUND

The present invention is related to an apparatus, system and method for transporting voice and data over Ethernet. Traditionally, networks have operated on a best-effort delivery basis. All traffic has equal priority and an equal chance of being delivered in a timely manner. When congestion occurs, all traffic has an equal chance of being dropped. While this may be acceptable for the delivery of data, it is typically not acceptable for the delivery of voice. Accordingly, most Ethernet service has been limited to data transport only. Although some parties have used Ethernet service for enterprise voice transport, the overall quality of such voice transport has often been compromised due to a lack of any Quality of Service (QoS) guarantees. Thus, there exists a need for an apparatus, system and method for transmitting voice and data over Ethernet that overcomes known limitations, shortcomings, and disadvantages.

SUMMARY

According to one embodiment, the present invention provides an apparatus for receiving a voice call and constructing an Ethernet frame representative of the voice call. The apparatus includes a network interface card in communication with a telephone, a functional circuit in communication with the network interface card, wherein the functional circuit is for constructing an Ethernet frame, and an Ethernet port in communication with the functional circuit.

According to another embodiment, the present invention provides a system for transporting voice over Ethernet. The system includes an integrated access device in communication with a telephone, a delivery network in communication with the integrated access device, and a softswitch complex in communication with the delivery network and a telecommunication network.

According to another embodiment, the present invention provides a method for transporting voice over Ethernet. The method includes receiving signals associated with a voice call, constructing an Ethernet frame, wherein the Ethernet frame includes information representative of the signals, transporting the Ethernet frame across a delivery network, deconstructing the Ethernet frame, and forwarding the information representative of the signals to a telecommunications network.

These and various other embodiments of the invention are pointed out with particularity in the claims annexed hereto and forming a part hereof. For a better understanding of the invention, however, reference should be made to the drawings which form a further part hereof, and to the accompanying descriptive matter, in which there are illustrated and described specific examples of an apparatus, system and method in accordance with the invention.

BRIEF DESCRIPTION OF THE DRAWINGS

FIG. 4A illustrates one example of an Ethernet frame constructed by the functional circuit 46 according to one embodiment of the present invention;

FIG. 4B illustrates another example of an Ethernet frame constructed by the functional circuit 46 according to another embodiment of the present invention;

DESCRIPTION

It is to be understood that the figures and descriptions of the present invention have been simplified to illustrate elements that are relevant for a clear understanding of the present invention, while eliminating, for purposes of clarity, other elements of a conventional communication network. For example, the media converters for converting electrical signals to optical signals are not shown or described herein. Those of ordinary skill in the art will recognize, however, that these and other elements may be desirable in a typical communications network. However, because such elements are well known in the art, and because they do not facilitate a better understanding of the present invention, a discussion of such elements is not provided herein.

Figure 1:
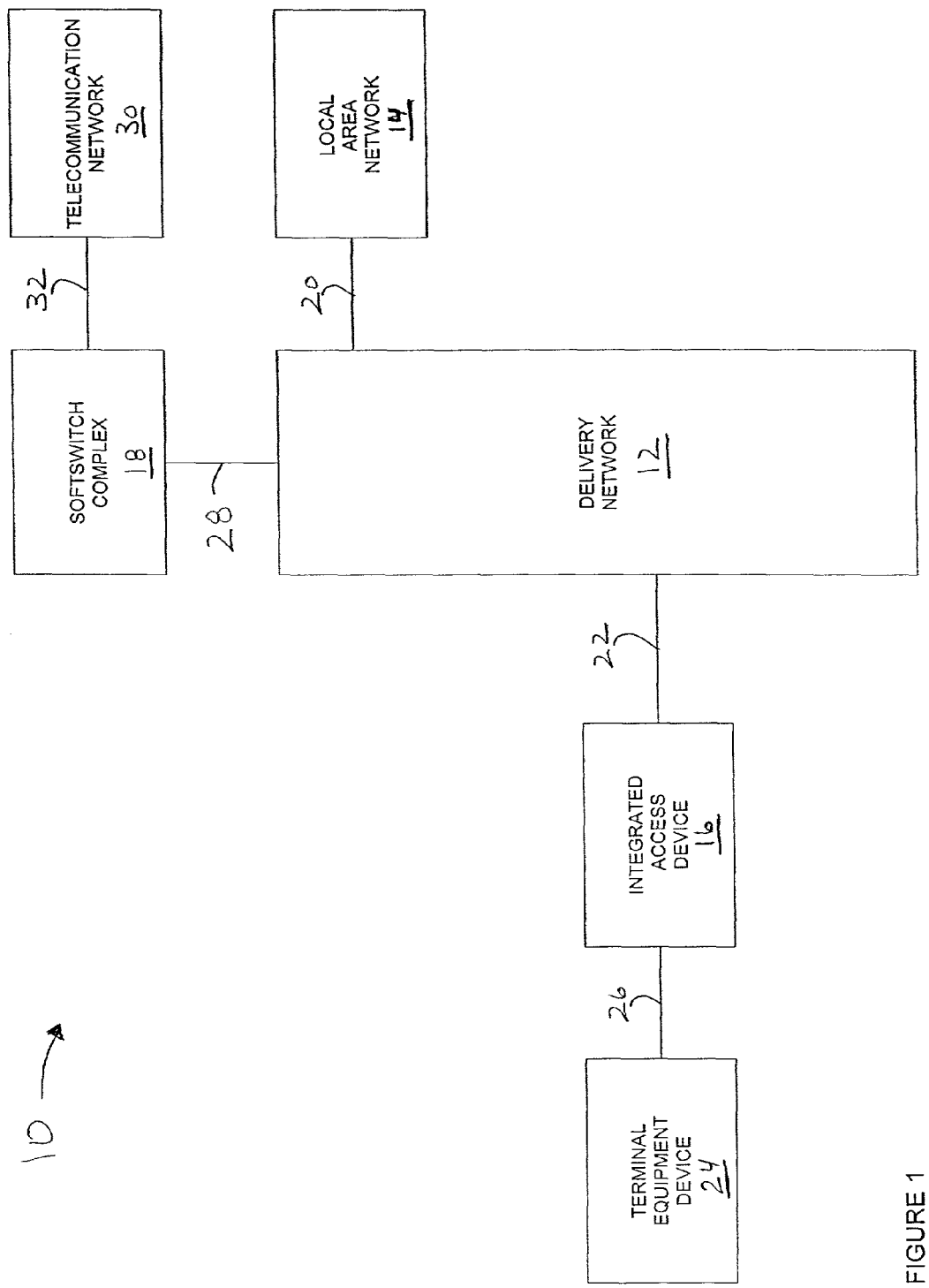
FIG. 1 illustrates a simplified block diagram of a system according to one embodiment of the present invention.

FIG. 1 illustrates a simplified block diagram of a system 10 according to one embodiment of the present invention. The system 10 may include a delivery network 12, a local area network 14, an integrated access device 16, and a softswitch complex 18. As will be described hereinbelow, devices associated with the system 10 may be logically grouped to form a plurality of virtual local area networks (VLANs), and the system 10 may be used to transport both voice and data over Ethernet.

The delivery network 12 may be any packet-switched network suitable for carrying packetized information. According to one embodiment, the delivery network 12 may be, for example, the BellSouth network. According to another embodiment, the delivery network 12 may be, for example, a local area network, a wide area network, or any other communications network configured to carry packetized information. The delivery network 12 will be described in more detail hereinbelow with respect to FIG. 2.

The local area network 14 may be any short distance data communications network suitable for linking computers and peripheral devices under some form of standard control. The local area network 14 may be associated with a particular business, and may be in communication with the delivery network 12 via a communication link 20, which may be, for example, a fiber optic communication link. According to one embodiment, each of the devices associated with the local area network 14 may be logically grouped as members of a data VLAN. According to another embodiment, the system 10 may include a plurality of local area networks 14. Each local area network 14 may be associated with a different business, and may be in communication with the delivery network 12 via a different communication link 20. The devices associated with a particular local area network 14 may be logically grouped as members of a data VLAN that is unique to that particular local area network 14, and the devices associated with different local area networks 14 may be logically grouped as members of different data VLANs.

The integrated access device 16 may be located on the premises of a particular business, and may be in communication with the delivery network 12 via a communication link 22, which may be, for example, a fiber optic communication link. The integrated access device 16 may also be in communication with a terminal equipment device 24 via a communication link 26. The terminal equipment device 24 may be located on the same premises that the integrated access device 16 is located on. According to one embodiment, the integrated access device 16 may be in communication with different terminal equipment devices 24 via different communication links 26. According to another embodiment, the system 10 may include a plurality of integrated access devices 16, and each integrated access device 16 may be in communication with the delivery network 12 via a different communication link 22, and with different terminal equipment devices 24 via different communication links 26. The integrated access device 16 will be described in more detail hereinbelow with respect to FIG. 3.

The softswitch complex 18 may be in communication with the delivery network 12 via a communication link 28, which may be, for example, a fiber optic communication link. The softswitch complex 18 may also be in communication with a telecommunication network 30 via a communication link 32. The telecommunication network 30 may be any circuit-switched telecommunication network such as, for example, the public switched telephone network (PSTN). The softswitch complex 18 will be described in more detail hereinbelow with respect to FIG. 5.

Figure 2:
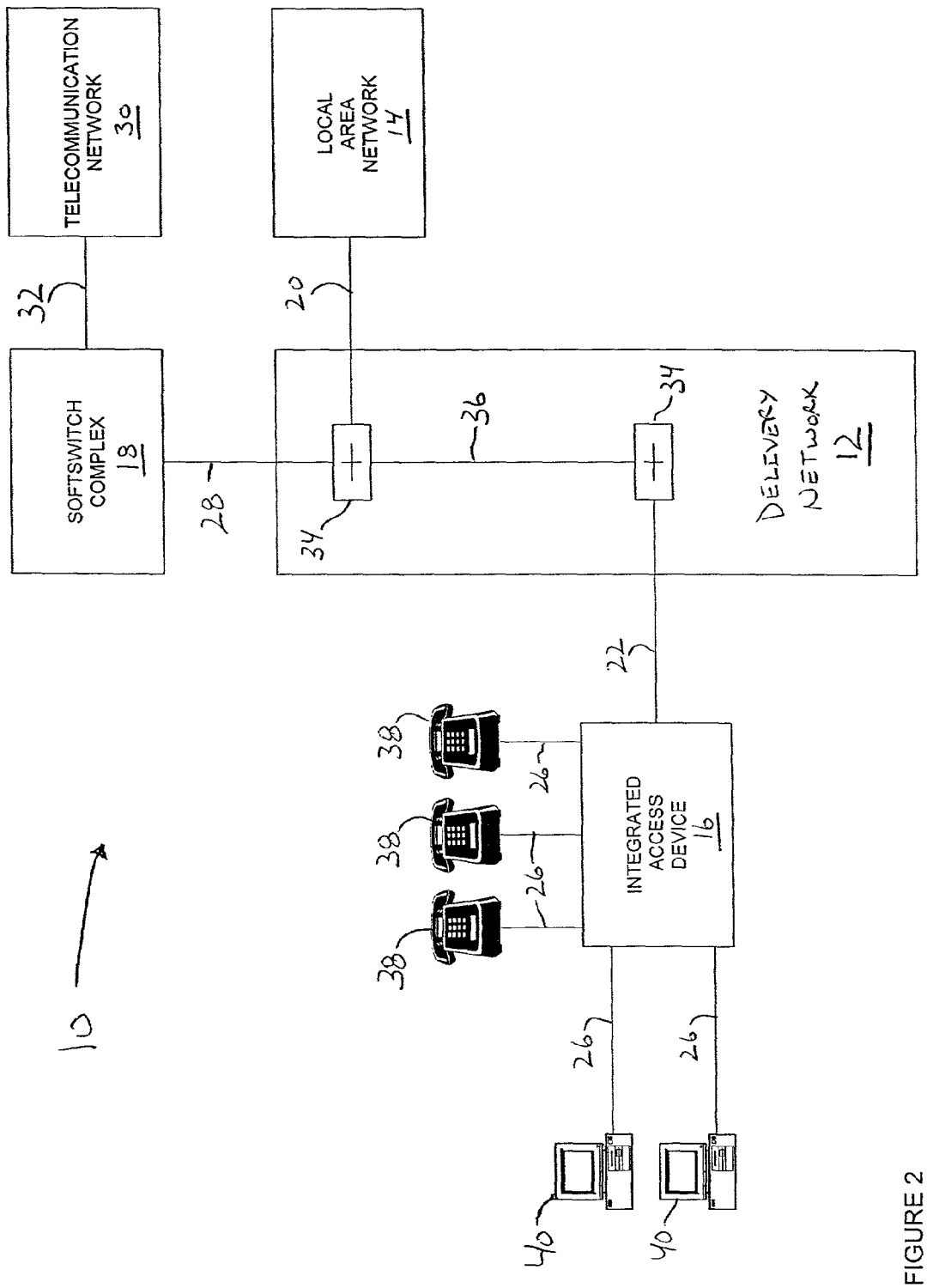
FIG. 2 illustrates a more detailed diagram of the system of FIG. 1 according to one embodiment of the present invention.

FIG. 2 illustrates a more detailed diagram of the system 10 of FIG. 1 according to one embodiment of the present invention. As illustrated in FIG. 2, the delivery network 12 may include an Ethernet switch 34. The Ethernet switch 34 may be logically grouped as a member of one or more VLANs. The Ethernet switch 34 may be in communication with a local area network 14 via the communication link 20, with an integrated access device 16 via the communication link 22, and/or with the softswitch complex 18 via the communication link 28. The Ethernet switch 34 may be located in a central office of the delivery system 12, and may be suitable for use with, for example, 10 Base-T Ethernet, Fast Ethernet, Gigabit Ethernet, or 10-Gigabit Ethernet. According to one embodiment, the system 10 may include a plurality of Ethernet switches 34. Each Ethernet switch 34 may be located in a different central office, and each Ethernet switch 34 may be logically grouped as a member of one or more VLANs. The plurality of Ethernet switches 34 may be in communication with one another via a communication link 36, which may be, for example, a fiber optic communication link. The delivery network 12 may also include, for example, intermediate nodes, proxy servers, routers, adapters, and wired or wireless data pathways, configured to direct and/or deliver data.

Each terminal equipment device 24 may be, for example, an analog device such as, for example, an analog telephone 38, or a digital device such as, for example, a computer 40. As illustrated in FIG. 2, each integrated access device 16 may be in communication with a plurality of telephones 38 and/or computers 40 via different communication links 26.

Figure 3:
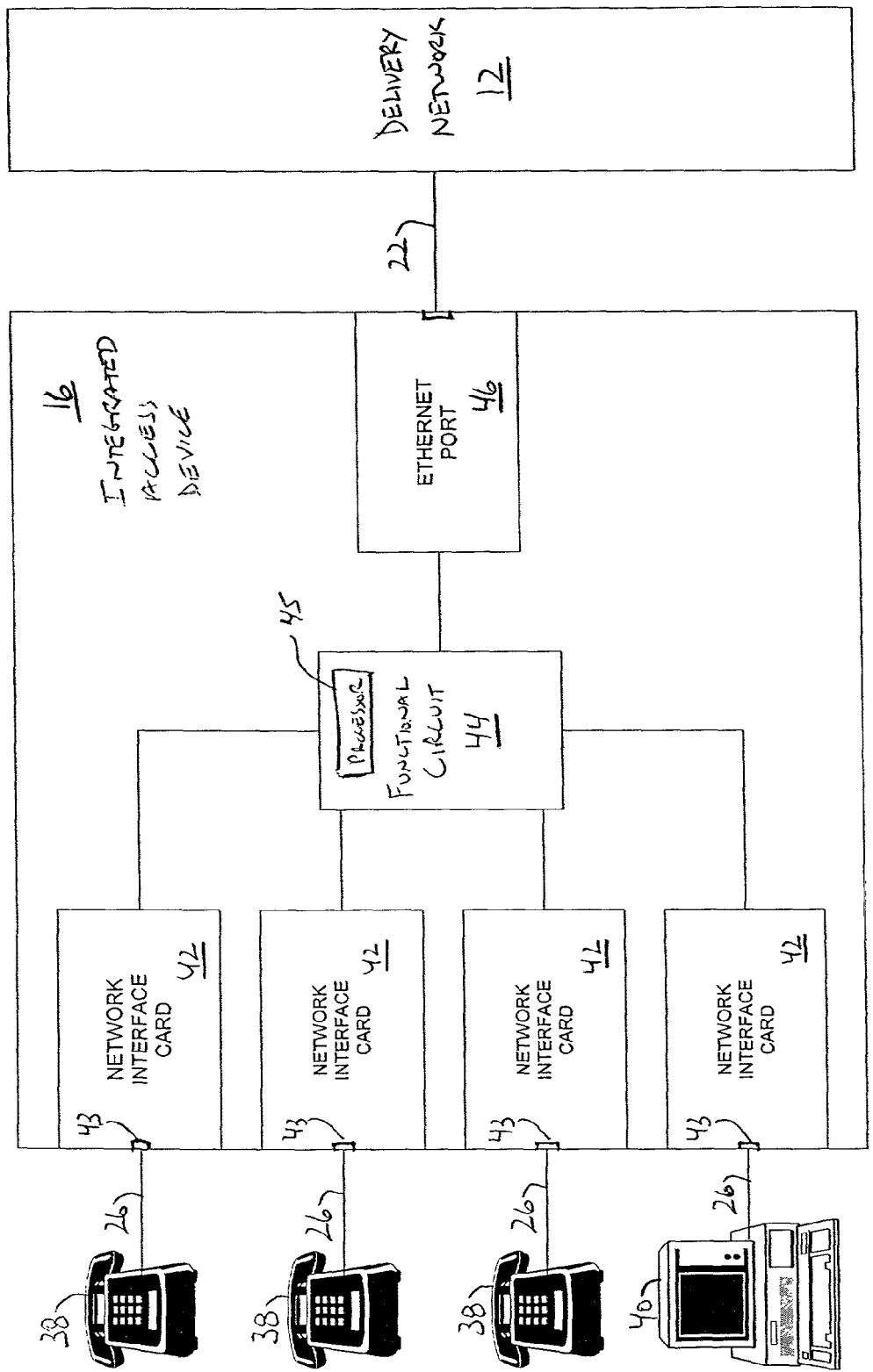
FIG. 3 illustrates a more detailed diagram of the integrated access device of FIG. 1 according to one embodiment of the present invention.

FIG. 3 illustrates a more detailed diagram of the integrated access device 16 of FIG. 1 according to one embodiment of the present invention. The integrated access device 16 may include a network interface card 42, a functional circuit 44, and an Ethernet port 46. According to one embodiment, the integrated access device 16 may be for receiving a voice call and constructing an Ethernet frame representative of the voice call.

The network interface card 42 may be in communication with a terminal equipment device 24 such as, for example, a telephone 38 or a computer 40, via the communication link 26. The network interface card 42 may be associated with a unique Ethernet address, and the terminal equipment device 24 in communication with the network interface card 42 may also be associated with the unique Ethernet address. The network interface card 42 may include a terminal equipment port 43 in communication with a terminal equipment device 24 such as, for example, a telephone 38 or a computer 40, via the communication link 26. Accordingly, the terminal equipment port 43 may also be associated with the unique Ethernet address. According to one embodiment, the network interface card may be in communication with a telephone 38, and may be logically grouped as a member a voice VLAN. According to another embodiment, the network interface card 42 may be in communication with a computer 40, and may be logically grouped as a member of a data VLAN.

As illustrated in FIG. 3, the integrated access device 16 may include a plurality of network interface cards 42, and each network interface card 42 may be associated with a different Ethernet address. Each network interface card 42 may be limited to communication with a single terminal equipment device 24, and may include a terminal equipment port 43 in communication with a telephone 38 or a computer 40. According to one embodiment, network interface cards 42 in communication with a telephone 38 may be logically grouped as members of a common voice VLAN, and network interface cards 42 in communication with a computer 40 may be logically grouped as members of different data VLANs. Thus, each telephone 38 in communication with the integrated access device 16 may be associated with a common voice VLAN and may be associated with a different Ethernet address. Each computer 40 in communication with the integrated access device 16 may be associated with a different data VLAN and may be associated with a different Ethernet address.

The functional circuit 44 may be in communication with the network interface card 42 and the Ethernet port 46. According to one embodiment, the functional circuit 44 may include a processor 45. The processor 45 may be a central processing unit (CPU) including, e.g., a microprocessor, an application specific integrated circuit (ASIC), or one or more printed circuit boards. According to another embodiment, the functional circuit 44 may be for processing a signal (or signals) received from a terminal equipment device 24 via a network interface card 42. The signals received from the terminal equipment device 24 may be analog signals from a telephone 38 in communication with the integrated access device 16, or digital signals from a computer 40 in communication with the integrated access device 16. According to another embodiment, the signals received by the functional circuit 44 may be analog signals, digital signals, or any combination thereof, including a plurality of analog and digital signals from a plurality of terminal equipment devices 28 in communication with the integrated access device 16. The processing of the signals received from the terminal equipment device 28 may include, for example, converting analog signals to digital signals, constructing an Ethernet frame that includes data representative of information received via the network interface card 42, and passing the Ethernet frame to the Ethernet port 46. The Ethernet port 46 may be for connection to an Ethernet, and may be in communication with the Ethernet switch 34 via the communication link 22.

FIG. 4A illustrates one example of an Ethernet frame 50 constructed by the functional circuit 44 according to one embodiment of the present invention. The Ethernet frame 50 may include a preamble field 52, a start of frame delimiter field 54, a destination address field 56, a source address field 58, a length/type field 60, a data field 62 and a frame check sequence field 64.

The destination address field 56 may include information that may identify which device or devices should receive the transported Ethernet frame 50. According to one embodiment, the destination address field 56 may include information indicating the Ethernet address of a device connected to one of the local area networks 14, thereby identifying the device as the intended recipient of the transported Ethernet frame 50. According to another embodiment, the destination address field 56 may include information indicating a plurality of Ethernet addresses associated with devices connected to one of the local area networks 14.

The source address field 58 may include information that may identify the source of the constructed Ethernet frame 50. For example, the source address field 56 may include information indicating the Ethernet address of a particular network interface card 42, thereby identifying the particular network interface card 42 as the source of the constructed Ethernet frame.

The data field 62 may include information representative of a voice call originated from a telephone 38 in communication with the integrated access device 16, or from data transmitted by a computer 40 in communication with the integrated access device 16.

FIG. 4B illustrates another example of an Ethernet frame 50 that may be constructed by the functional circuit 44 according to another embodiment of the present invention. As illustrated in FIG. 4B, the Ethernet frame 50 may also include a VLAN header 66 between the source address field 58 and the length/type field 60. The VLAN header 66 may include a first field 68 that indicates that the Ethernet frame 50 is a tagged Ethernet frame 50, and a second field 69 that includes the transmission priority of the tagged Ethernet frame 50 and a VLAN identifier. The transmission priority of the tagged Ethernet frame 50 may be assigned a value from zero to seven, where zero is considered to be the lowest transmission priority and seven is considered to be the highest transmission priority. The VLAN identifier may uniquely identify a particular VLAN over which the tagged Ethernet frame 50 is to be sent. For example, the VLAN-identifier may indicate that a particular Ethernet frame 50 is to be sent over the common voice VLAN, or may indicate that a particular Ethernet frame 50 is to be sent over a particular data VLAN. According to one embodiment, the functional circuit 44 may assign a higher transmission priority to Ethernet frames 50 to be sent over the common voice VLAN, and a lower transmission priority to Ethernet frames 50 to be sent over any of the data VLANs. For example, the functional circuit 44 may assign a transmission priority of five, six, or seven for Ethernet frames 50 to be sent over the common voice VLAN depending on the quality of service desired by a particular customer, and a transmission priority of zero, one, two, three, or four for Ethernet frames 50 to be sent over any of the data VLANs depending on the quality of service desired by a particular customer.

Returning to FIG. 3, the functional circuit 44 may also be for processing an Ethernet frame 50 received from the delivery network 20 via the Ethernet port 46. The processing of the Ethernet frame 50 may include comparing the destination address field 56 of the received Ethernet frame 50 to the Ethernet addresses associated with the network interface cards 42 of the integrated access device 16, deconstructing the received Ethernet frame 50 to obtain the information included in the data field 62, and routing the information included in the data field 62 to the appropriate terminal equipment device 28 via a terminal equipment port 43. For information routed to a telephone 38 in communication with the integrated access device 16, the functional circuit 44 may also convert the information from digital signals to analog signals prior to transmission to the telephone 38 via communication link 26.

Figure 5:
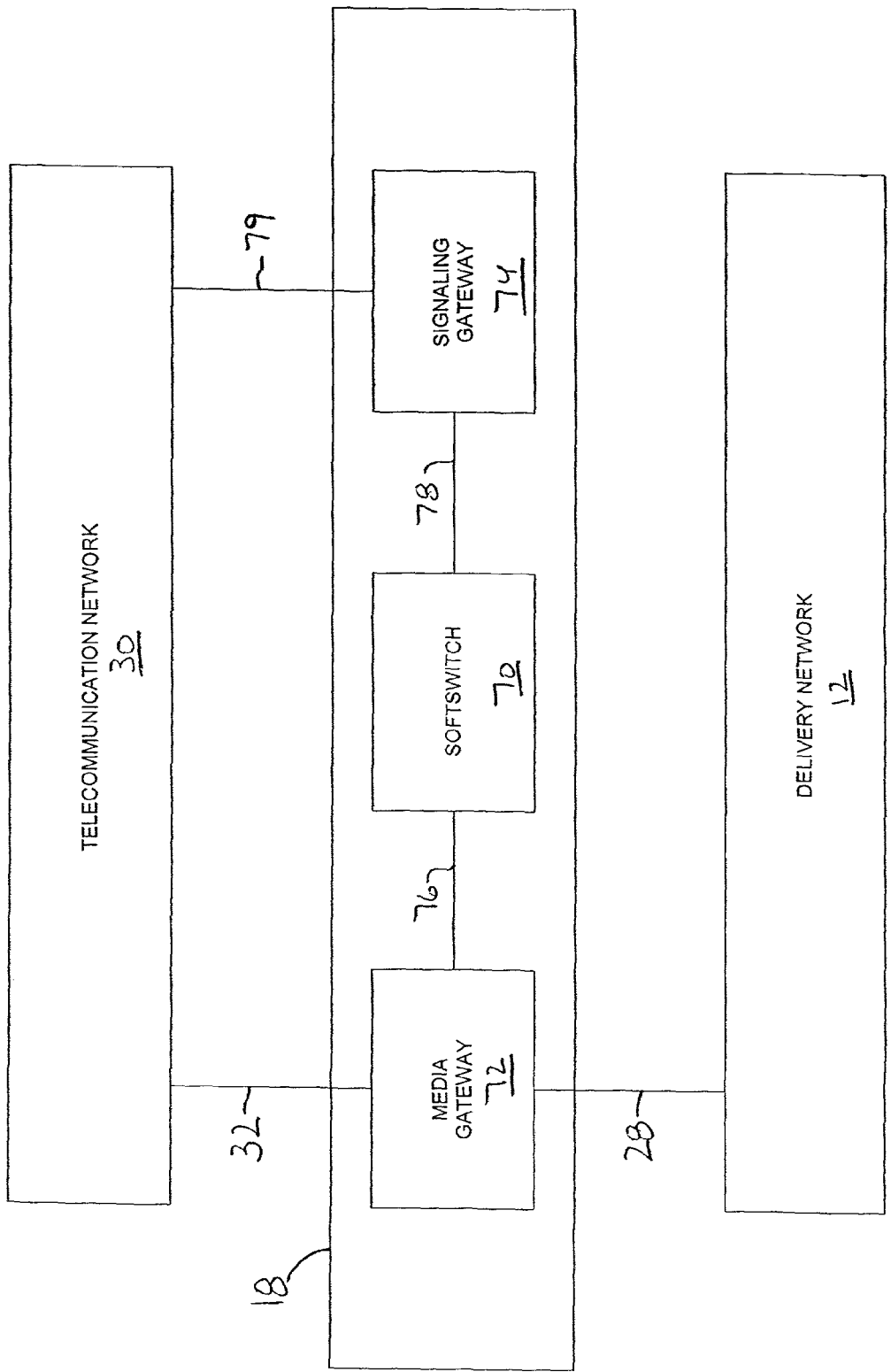
FIG. 5 illustrates a more detailed diagram of the softswitch complex of FIG. 1 according to one embodiment of the present invention.

FIG. 5 illustrates a more detailed diagram of the softswitch complex 18 of FIG. 1 according to one embodiment of the present invention. The softswitch complex 18 may include a softswitch 70, a media gateway 72, and a signaling gateway 74, and may provide access to the telecommunication network 30 for voice calls originated at a telephone 38 in communication with an integrated access device 16. According to one embodiment, the softswitch 70 and the media gateway 72 may be logically grouped as members of a common voice VLAN.

The softswitch 70 may be any programmable network switch suitable for processing the signaling for various types of packet protocols. The softswitch 70 may include any number of processors, and may serve to control the media gateway 72 and the signaling gateway 74.

The media gateway 72 may be in communication with the delivery network 12 via the communication link 28, and with the softswitch 70 via a communication link 76. The media gateway 72 may receive certain Ethernet frames 50 from the delivery network 12. Such Ethernet frames 50 may be limited to, for example, Ethernet frames 50 that are associated with voice calls. The media gateway 72 may receive such Ethernet frames 50, and in conjunction with the softswitch 70, may deconstruct the Ethernet frames 50 and convert the information in the data field 62 to signals suitable for transmission over the telecommunication network 30. The media gateway 72 may pass such signals to the telecommunication network 30 via the communication link 32 for further transmission.

The signaling gateway 74 may be in communication with the softswitch 70 via a communication link 78, and with the telecommunication network 30 via a communication link 79. The signaling gateway 74 may be any software-based device configured to resolve interface issues between the packet-switched delivery network 20 and the circuit-switched telecommunication network 30.

Figure 6:
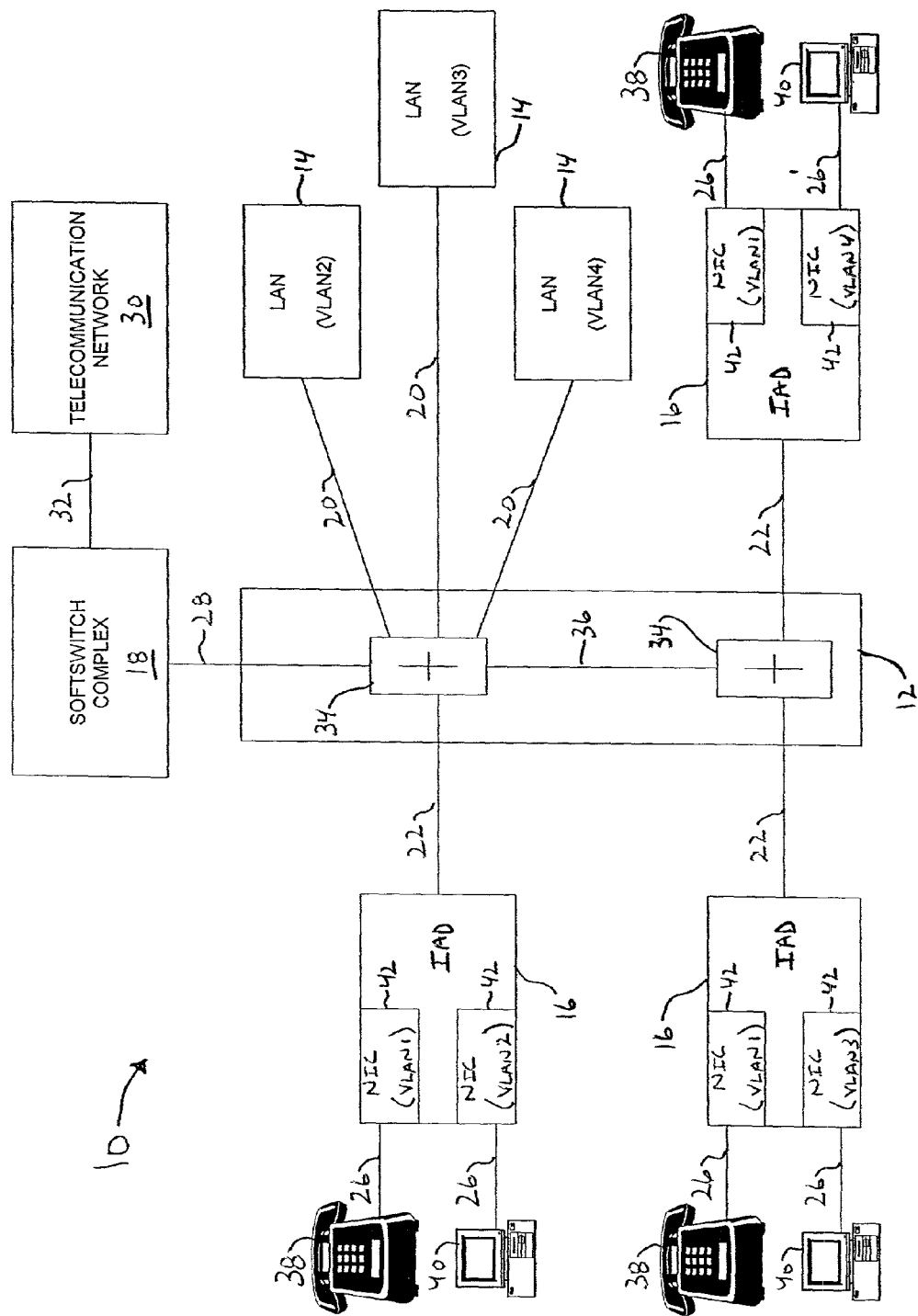
FIG. 6 illustrates a more detailed diagram of the system of FIG. 1 according to another embodiment of the present invention.

FIG. 6 illustrates a more detailed diagram of the system 10 of FIG. 1 according to another embodiment of the present invention. As illustrated in FIG. 6, each local area network 14 may be associated with a different business, and may be in communication with the delivery network 12 via a different communication link 20. The devices associated with a particular local area network 14 may be logically grouped as members of a data VLAN that is unique to that particular local area network 14, and the devices associated with different local area networks 14 may be logically grouped as members of different data VLANs. In addition, each network interface card 42 in communication with a computer 40 via a terminal equipment port 43 may be logically grouped to be a member of a different data VLAN. For example, one such network interface card 42 may be logically grouped as a member of VLAN2, another such network interface card 42 may be logically grouped as a member of VLAN3, and another such network interface card 42 may be logically grouped as a member of VLAN4. Thus, computers 40 that are physically remote from the premises of a particular business may nonetheless be grouped logically with the computers and peripherals located at the premises of the business.

For network interface cards 42 in communication with a telephone 38 via a terminal equipment port 43, such network interface cards 42 may be logically grouped as members of a common voice VLAN (designated as VLAN1). According to one embodiment, VLAN1 may terminate at the softswitch complex 18. According to another embodiment, VLAN1 may terminate at an Ethernet switch 34.

Figure 7:
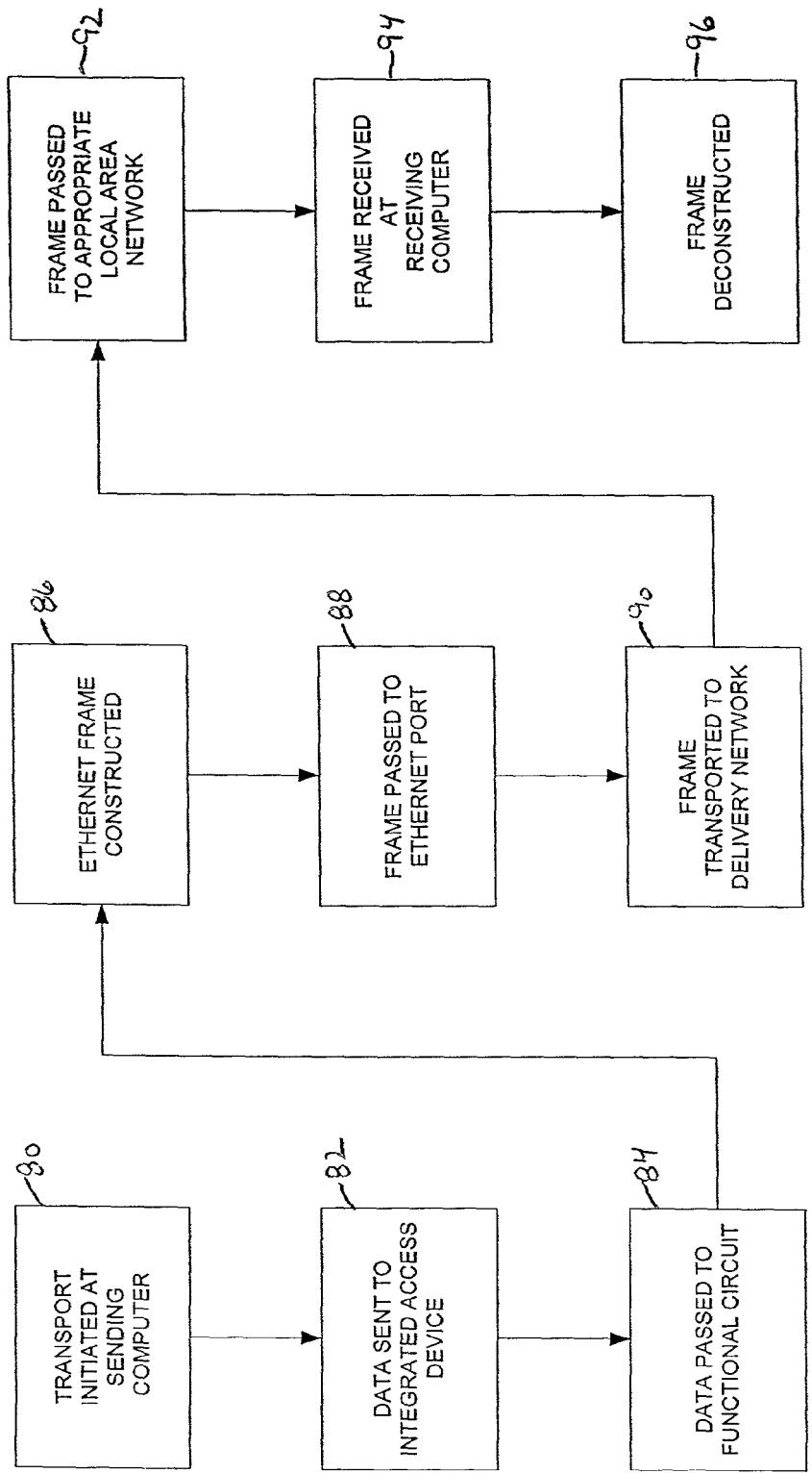
FIG. 7 illustrates a process flow for transporting data over Ethernet according to one embodiment of the present invention.

FIG. 7 illustrates a process flow for transporting data over Ethernet according to one embodiment of the present invention. The process begins at block 80, where the transport of data from a sending computer 40 logically grouped as a member of a data VLAN is initiated by a user of the sending computer 40. The system 10 may be used to transport data from one member of a particular data VLAN to any other members of the same data VLAN, but cannot be used to transport data from one member of a particular VLAN to a member of a different data VLAN. For example, the system 10 may be used to transport data from a member of VLAN2 to any other member of VLAN2, but cannot be used to transport data from a member of VLAN2 to a member of VLAN3 or VLAN4.

From block 80, the process proceeds to block 82, where the data are sent to the integrated access device 16 via communication link 26. From block 82, the process proceeds to block 84, where the data are received at a terminal equipment port 43, and passed to the functional circuit 44 of the integrated access device 16 via the network interface card 42. From block 84, the process proceeds to block 86, where the functional circuit 44 constructs an Ethernet frame 50 that includes information representative of the data transmitted from the sending computer 40. As described hereinbefore, the Ethernet frame 50 may also include a destination address field 56, a source address field 58, and a VLAN header 64. The Ethernet frame 50 may include a transmission priority of zero through four, and may identify, for example, VLAN3 as the data VLAN over which the Ethernet frame 50 is to be transported.

From block 86, the process proceeds to block 88, where the functional circuit 44 passes the constructed Ethernet frame 50 to the Ethernet port 46 of the integrated access device 16. From block 88, the process proceeds to block 90, where the Ethernet port 46 receives the Ethernet frame 50 and transports the Ethernet frame 50 to the delivery network 12 via communication link 22. From block 90, the process proceeds to block 92, where the delivery network 12 receives the Ethernet frame 50, and, based on the destination address indicated in the destination address field 56 of the Ethernet frame 50, passes the Ethernet frame 50 to the appropriate local area network 14 via communication link 20. According to one embodiment, the Ethernet frame 50 may pass through one or more Ethernet switches 34 en route to the appropriate local area network 14. From block 92, the process proceeds to block 94, where a receiving computer connected to the appropriate local area network 14 receives the Ethernet frame 50. The receiving computer may be associated with an Ethernet address that is the same as the Ethernet address identified in the destination address field 56 of the Ethernet frame 50, and may be logically grouped as a member of the same data VLAN as the sending computer 40. From block 94, the process proceeds to block 96, where the receiving computer deconstructs the Ethernet frame 50, thereby gaining access to the information representative of the data transmitted by the sending computer 40.

Figure 8:
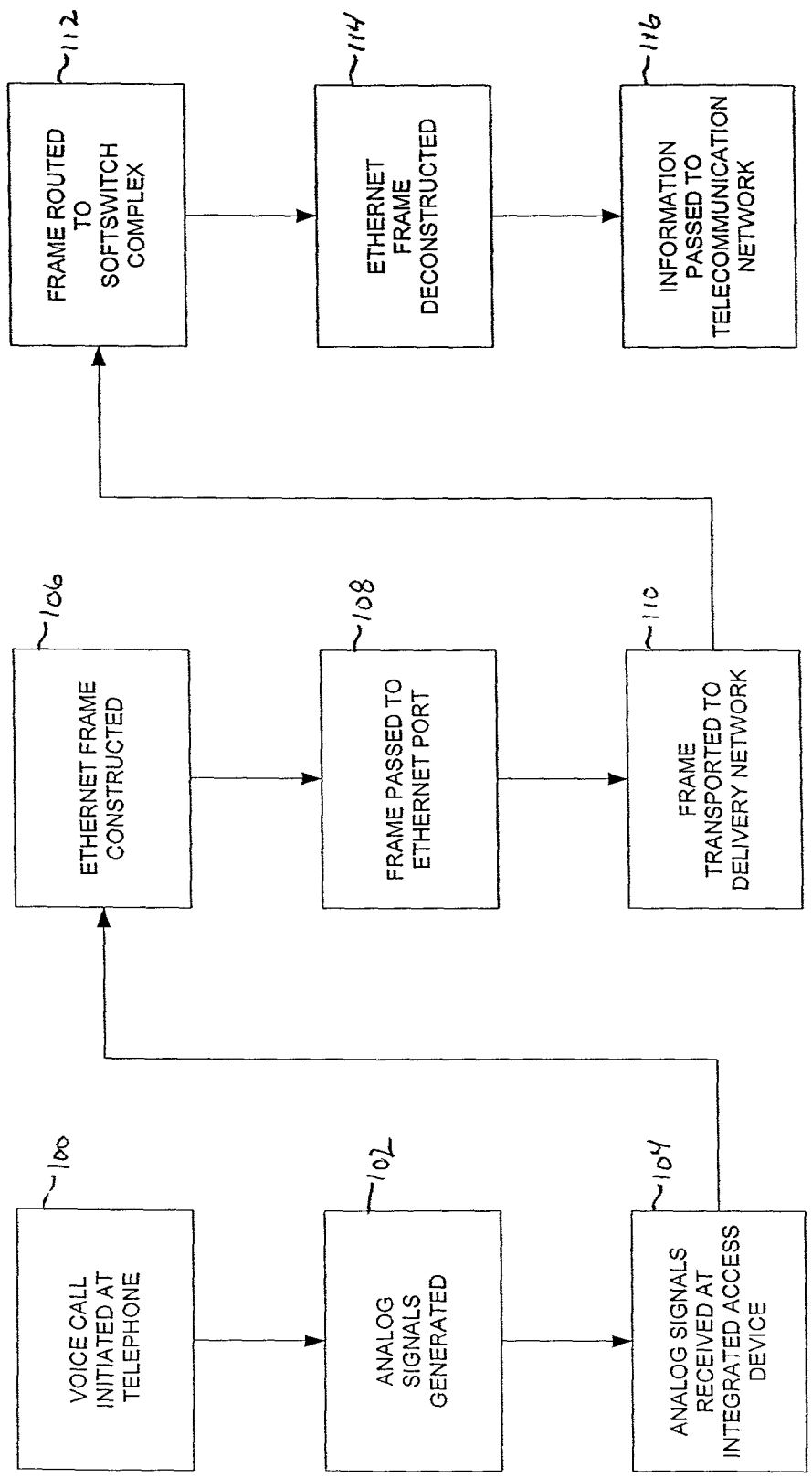
FIG. 8 illustrates a process flow for transporting voice over Ethernet according to one embodiment of the present invention.

FIG. 8 illustrates a process flow for transporting voice over Ethernet according to one embodiment of the present invention. The process begins at block 100, where a voice call is initiated from a telephone 38 logically grouped as a member of a common voice VLAN. Such a common voice VLAN may be designated as, for example, VLAN1. From block 100, the process proceeds to block 102, where the telephone 38 generates analog signals associated with the voice call, and passes the analog signals to the integrated access device 16 via a communication link 26. Such analog signals may include, for example, information concerning the telephone number of the called device, the telephone number of the calling device, and the content of the voice call. From block 102, the process proceeds to block 104, where the analog signals are received at a terminal equipment port 43, and passed to the functional circuit 44 of the integrated access device 16 via a network interface card 42.

From block 104, the process proceeds to block 106, where the functional circuit 44 receives the analog signals, converts the analog signals to digital signals representative of the analog signals, and constructs an Ethernet frame 50 that includes information representative of the analog signals transmitted from the telephone 38. As described hereinbefore, the Ethernet frame 50 may also include a destination address field 56, a source address field 58, and a VLAN header 66. The Ethernet frame 50 may include a transmission priority of five through seven, and may identify, for example, VLAN1 as the voice VLAN over which the Ethernet frame 50 is to be transported.

From block 106, the process proceeds to block 108, where the functional circuit 44 passes the Ethernet frame 50 to the Ethernet port 46 of the integrated access device 16. From block 108, the process proceeds to block 110, where the Ethernet port 46 receives the Ethernet frame 50 and transports the Ethernet frame 50 to the delivery network 12 via the communication link 22. From block 110, the process proceeds to block 112, where the delivery network 12 receives the Ethernet frame 50 and routes the Ethernet frame 50 to the softswitch complex 18 via communication link 28. According to one embodiment, the Ethernet frame 50 may pass through one or more Ethernet switches 34 en route to the softswitch complex 18.

From block 112, the process proceeds to block 114, where the Ethernet frame 50 is received by the softswitch complex 18, and deconstructed to obtain the information representative of the voice call. Such information may indicate, for example, the telephone number of the called device, the telephone number of the calling device, and the content of the voice call. From block 114, the process proceeds to block 116, where the softswitch complex 18 passes the information to the telecommunication network 30 for delivery to the called device.

While several embodiments of the invention have been described, it should be apparent, however, that various modifications, alterations and adaptations to those embodiments may occur to persons skilled in the art with the attainment of some or all of the advantages of the present invention. For example, according to one embodiment of the present invention, the functional circuit 44 of the integrated access device 16 may comprise a portion of a network interface card 42. According to another embodiment, the Ethernet port 46 of the integrated access device may comprise a portion of the functional circuit 44. It is therefore intended to cover all such modifications, alterations and adaptations without departing from the scope and spirit of the present invention as defined by the appended claims.

What is claimed is:

1. An apparatus comprising:
a plurality of network interface cards,
wherein a first group of the plurality of network interface cards are each associated with a different Ethernet address and are logically grouped as members of a voice VLAN, and each of the first group of the plurality of network interface cards includes a terminal equipment port that is configured to be connected to a different one of a plurality of telephones,
wherein a second group of the plurality of network interface cards are each associated with a different Ethernet address and are logically grouped as members of a data VLAN, and each includes a terminal equipment port that is configured to be connected to a different one of a plurality of computers;
a functional circuit in communication with the plurality of network interface cards and configured to connect to an Ethernet network, wherein the functional circuit is configured to construct an Ethernet frame including data representative of information received via the network interface cards, and configured to deconstruct an Ethernet frame received via an Ethernet port, wherein the function circuit is configured to assign a higher transmission priority to Ethernet frames that are constructed for sending over the voice VLAN than Ethernet frames that are constructed for sending over the data VLAN; and an Ethernet port in communication with the functional circuit.

2. The apparatus of claim 1, wherein the function circuit is configured to construct a plurality of Ethernet frames, each including data representative of information received via the network interface cards from connected telephones.

3. The apparatus of claim 1, wherein the functional circuit is configured to deconstruct an Ethernet frame received via the Ethernet port, and to route the deconstructed Ethernet frame to one of the network interface cards having an Ethernet address identified by the Ethernet frame.

4. The apparatus of claim 1, wherein the Ethernet port is for connection to an Ethernet.

5. A system for transporting voice over Ethernet, the system comprising:
an integrated access device in communication with a telephone;
a delivery network in communication with the integrated access device;
a softswitch complex in communication with the delivery network and a telecommunication network;
wherein the integrated access device includes:
a plurality of network interface cards,
wherein a first group of the plurality of network interface cards is each associated with a different Ethernet address and are logically grouped as members of a voice VLAN, and each of the first group of the plurality of network interface cards includes a terminal equipment port that is configured to be connected to a different one of a plurality of telephones,
wherein a second group of the plurality of network interface cards is each associated with a different Ethernet address and are logically grouped as members of a data VLAN, and each includes a terminal equipment port that is configured to be connected to a different one of a plurality of computers;
a functional circuit in communication with the plurality of network interface cards and configured to connect to an Ethernet network, wherein the functional circuit is configured to construct an Ethernet frame including data representative of information received via the network interface cards, and configured to deconstruct an Ethernet frame received via the Ethernet port, wherein the function circuit is configured to assign a higher transmission priority to Ethernet frames that are constructed for sending over the voice VLAN than Ethernet frames that are constructed for sending over the data VLAN; and
an Ethernet port in communication with the functional circuit.

6. The system of claim 5, wherein the delivery network includes an Ethernet switch.

7. The system of claim 6, wherein the Ethernet switch is logically grouped as a member of a VLAN.

8. The system of claim 6, wherein the Ethernet switch is logically grouped as a member of a plurality of VLANs.

9. The system of claim 5, wherein the delivery network includes a plurality of Ethernet switches.

10. The system of claim 5, wherein the softswitch complex includes:
a media gateway in communication with the delivery network;
a signaling gateway in communication with the telecommunication network; and
a softswitch in communication with the media gateway and the signaling gateway.

11. The system of claim 10, wherein the media gateway is in communication with the telecommunication network.

12. The system of claim 10, wherein the telecommunication network is the PSTN.

13. A method for transporting voice over Ethernet, the method comprising:
receiving signals associated with a voice calls from a first group of a plurality network interface cards that are each associated with a different Ethernet address and are logically grouped as members of a voice VLAN, and each of the first group of the plurality of network interface cards includes a terminal equipment port that is configured to be connected to a different one of a plurality of telephones to receive the signals associated with voice calls;
receiving signals associated with data communications from a second group of the plurality of network interface cards that are each associated with a different Ethernet address and are logically grouped as members of a data VLAN, and each of the second group of the plurality of network interface cards includes a terminal equipment port that is configured to be connected to a different one of a plurality of computers to receive the signals associated with the data communications;
constructing Ethernet frames, wherein the Ethernet frames include information representative of the signals, and wherein a higher transmission priority is assigned to Ethernet frames that are constructed for transportation over the voice VLAN than Ethernet frames that are constructed for transportation over the data VLAN;
transporting the Ethernet frames across the voice VLAN or the data VLAN;
deconstructing the Ethernet frames; and
forwarding the information representative of the signals to a telecommunications network.

14. The method of claim 13, wherein receiving signals associated with a voice call includes receiving signals associated with a plurality of voice calls.

15. The method of claim 13, wherein transporting the Ethernet frame across a delivery network includes passing the Ethernet frame through an Ethernet switch.

16. The method of claim 13, wherein transporting the Ethernet frame across a delivery network includes passing the Ethernet frame through a plurality of Ethernet switches.

17. The method of claim 13, wherein deconstructing the Ethernet frame includes retaining the information associated with the signals.

18. The method of claim 13, wherein forwarding the information representative of the signals to a telecommunications network includes forwarding the information to the PSTN.

* * * * *